(12) United States Patent
Williams et al.

(10) Patent No.: US 6,206,531 B1
(45) Date of Patent: Mar. 27, 2001

(54) LIGHTWEIGHT PRECISION OPTICAL MIRROR SUBSTRATE AND METHOD OF MAKING

(75) Inventors: Brian E. Williams, Simi Valley; Russell M. Ono, Rancho Cucamonga, both of CA (US)

(73) Assignees: Ultramet, Pacoima; Ono Labratiories, Rancho Cucamaga, both of CA (US)

( * ) Notice: Subject to any disclaimer, the term of this patent is extended or adjusted under 35 U.S.C. 154(b) by 0 days.

(21) Appl. No.: 09/318,489

(22) Filed: May 25, 1999

(51) Int. Cl.[7] .............. G02B 5/08; G02B 7/182
(52) U.S. Cl. .......... 359/883; 359/846; 359/896; 359/900
(58) Field of Search .................. 359/845–848, 359/883, 896, 871, 900, 884; 428/213, 216, 448, 912.2, 408, 446, 141, 698; 427/10, 162, 249.15, 253, 307.7, 344, 249.16; 65/36, 54, 55

(56) References Cited

U.S. PATENT DOCUMENTS

| | | | |
|---|---|---|---|
| 3,925,577 | * 12/1975 | Fatzer et al. | 427/249 |
| 4,035,065 | 7/1977 | Fletcher et al. | 359/848 |
| 4,547,432 | * 10/1985 | Pitts et al. | 428/448 |
| 4,670,338 | 6/1987 | Clemino | 428/312.6 |
| 4,780,372 | * 10/1988 | Tracy et al. | 428/428 |
| 4,814,232 | * 3/1989 | Bluege et al. | 428/450 |
| 4,856,887 | 8/1989 | Wakugawa et al. | 359/883 |
| 5,002,378 | 3/1991 | Colarusso et al. | 359/845 |
| 5,058,993 | 10/1991 | Wakugawa | 359/896 |
| 5,106,687 | 4/1992 | Tanino et al. | 428/141 |
| 5,316,564 | 5/1994 | Nakamura et al. | 65/36 |
| 5,448,418 | 9/1995 | Hotate et al. | 359/883 |
| 5,640,282 | 6/1997 | Ise et al. | 359/846 |

* cited by examiner

Primary Examiner—Thong Nguyen
(74) Attorney, Agent, or Firm—Bruce A. Jagger

(57) ABSTRACT

A high precision composite optical mirror substrate comprising a lightweight reticulated foam core which is less than about 25 percent dense, an initially separate dense or small pore size faceplate mounted to the core, and a continuous formed in situ encapsulating coating. The coating fully encapsulates the ligaments throughout the reticulated foam core, the juncture between the core and the faceplate, and the faceplate, including the exposed face of the faceplate (the mirror surface). The exposed face of the dense faceplate is shaped to about the desired mirror surface shape. The deposit of coating material on the exposed face of the faceplate is near net shape to the desired mirror surface. The physical characteristics of the composite substrate are dominated by the properties of the coating material. When the coating material is a chemical vapor deposit of silicon carbide, the interlayer is preferably graphite with a thermal expansion coefficient that closely matches that of the silicon carbide. The silicon carbide encapsulated substrate is very strong, rigid, and thermally and structurally stable.

13 Claims, 2 Drawing Sheets

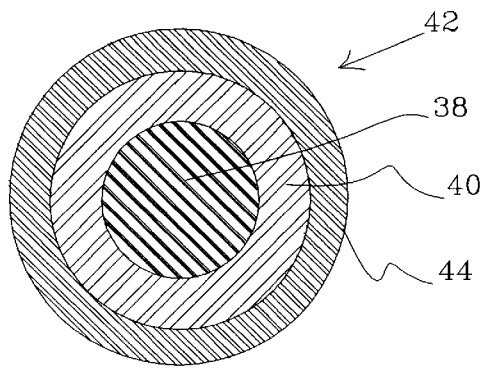
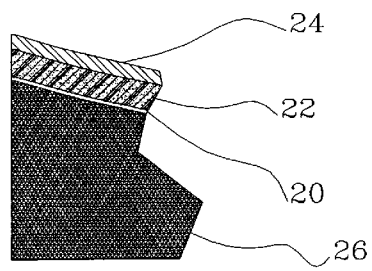
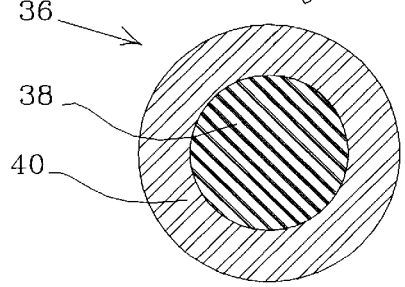
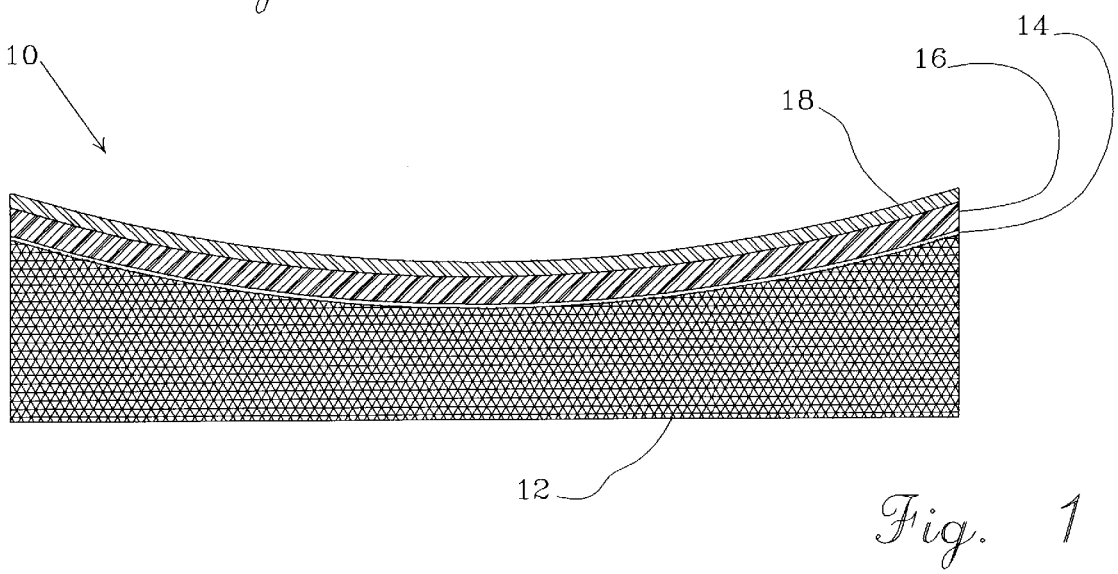

LIGHTWEIGHT PRECISION OPTICAL MIRROR SUBSTRATE AND METHOD OF MAKING

The U. S. Government has a paid-up license in this invention and rights in limited circumstances to require the patent owner to license others on reasonable terms as provided for by the terms of contract Nos. NAS1-19972 and NAS8-98207 awarded by the National Aeronautics and Space Administration.

BACKGROUND OF THE INVENTION

1. Field of the Invention

The invention relates in general to lightweight, precision, optical mirror, substrate structures, and, in particular, to such structures comprising a thermally and structurally stable fully encapsulated composite structure including a reticulated structural foam core and an initially separate faceplate, and a method of making such structures.

2. Description of the Prior Art

Previous attempts to produce high precision lightweight mirrors have generally been unsatisfactory for a variety of reasons. For example, Wakugawa et al., U.S. Pat. No. 4,856,887 discloses a monolithic silicon carbide foam core with at least one integrally formed silicon carbide face sheet. The face sheet is integrally formed on the silicon carbide foam by applying a layer of silicon carbide paste to a surface of the foam and then curing that paste to form the face sheet in situ. A reinforcing silicon carbide coating is applied to one or both of the cured integrally formed silicon carbide face sheets by, for example, chemical vapor deposition. It was not appreciated that such integrally formed silicon carbide face sheets have a different coefficient of thermal expansion from those silicon carbide deposits that are formed by chemical vapor deposition. Under vigorous thermal cycling and substantial thermal gradients, micro cracks appear in those chemical vapor deposited silicon carbide mirror surfaces which are supported by such integrally formed face sheets. For this reason, among others, these structures are unsuitable for space-based applications. Glass plates, mounted on foamed silica or glass are generally not robust enough or stable enough under severe thermal and mechanical stress to provide reliable service. Various such structures have been proposed, for example, in Yoshiaki U.S. Pat. No. 5,640,282 (closed cell foamed glass core integrally bonded through a fused silica powder to a glass front plate with an optical surface); Clemino U.S. Pat. No. 4,670,338 (segmented glass foam core bonded by an organic glue to preformed glass plates); Fletcher U.S. Pat. No. 4,035,065 (large diameter cellular glass core bonded by an organic adhesive to a thin glass lamina which bears a reflective coating); and Tatsumasa Nakamura U.S. Pat. No. 5,316,564 (closed cell foamed glass body to which is fused a glass plate with an optical surface). Colarusso et al. U.S. Pat. No. 5,002,378 discloses a mirror cooling system in which a fully enclosed low density porous foam core with a graded pore size is used as a heat pipe for actively cooling a mirror. The purpose of Colarusso et al. is to transfer heat away from the faceplate so as to cool it, rather than to transfer heat away to prevent distortion. A faceplate is bonded, fritted, fused or otherwise mechanically attached to the core. The elements of the actively cooled structure are preferably composed of the same materials. A catalog of materials is listed for use as the face sheet, including, glass, silicon carbide, aluminum, high temperature ceramic, and beryllium. The disclosed substrate is not highly precise. There are a number of deficiencies in the proposed structure and process that, in the aggregate, render the substrate unacceptable for use in high precision mirror applications. The significant advantages to be achieved by fully encapsulating the structure in one monolithic coating were clearly not appreciated. Also, it was not appreciated that providing a graded core would tend to create unequal responses, with resulting physical distortions, to temperature changes and temperature differentials across the substrate. Fully sealing the foam core in a container also creates undesirable pressure gradients in, for example, space-based applications. Such pressure gradients add yet another potential contributing factor to the undesired physical distortion of the mirror surface. During manufacturing, particularly, grinding and polishing, an all silicon carbide face plate, as suggested by Colarusso et al., would require very careful handling because it is more brittle than graphite.

These and other difficulties of the prior art have been overcome according to the present invention.

BRIEF SUMMARY OF THE INVENTION

A preferred embodiment of the lightweight composite optical mirror substrate structure according to the present invention comprises a reticulated structural foam core, an initially separate, thin, dense, prefabricated interlayer rigidly joined to and supported by the reticulated structural core, and a thin optical grade (very fine grained and fully dense) near net shape deposited in situ coating of, for example, silicon carbide, on the exposed surface of the interlayer. The optical grade coating of, for example, silicon carbide, when ground, polished, and coated with various ultra thin optical coatings, which are generally in the order of only a few angstroms thick, serves as a thermally stable precision mirror surface. Such ultra thin optical coatings are generally thin film dielectrics. The prefabricated interlayer serves to provide a smooth uniform surface to receive and support the mirror surface forming deposit. The interlayer and the mirror coating of, for example, silicon carbide, together comprise a mirror faceplate. The reticulated foam provides structural strength and stiffness to the mirror substrate without contributing excessive mass. The present invention particularly contemplates mirror substrates from a centimeter or less to those in excess of one meter or more in diameter.

The inner elements of this optical mirror substrate are all preferably fully encapsulated within a monolithic, structural, formed in situ coating of, for example, silicon carbide. In addition to being capable of being formed into a precision mirror surface, the monolithic coating also exhibits substantial structural strength. The optical mirror substrate thus exhibits primarily the characteristics of the continuous monolithic coating, particularly the strength and thermal characteristics. The configuration of the reticulated structural core is defined, for example, by that of a fragile vitreous carbon skeleton. The fragile skeleton is fully encased in a much stronger coating of, for example, silicon carbide, to provide a reticulated structural foam. The encased skeleton generally provides very little if any of the structural or thermal characteristics of the optical mirror substrate.

The dense prefabricated interlayer, and its bond to the reticulated structural foam, are also generally fully encased by the structural coating so that their characteristics are also substantially dictated by those of the structural coating. It is, however, desirable that at least the thermal characteristics of the interlayer and its bond to the core be closely matched to those of the coating, because the dense interlayer's characteristics do generally influence somewhat the response of the mirror surface to thermal changes and gradients. The continuous monolithic structural coating thus serves to provide the mirror surface, to provide most of the structural strength for the substrate, to define most of the thermal characteristics of the substrate, and to bond the elements of the substrate into one unitary whole.

The mirror substrates according to the present invention are useful in the preparation of close tolerance optical devices which are intended to be used in extreme environments such as those encountered, for example, in space-based applications, other high or low temperature environments, high energy X-ray, chemical or gas dynamic lasers, cyclotrons, and the like. Such mirror substrates can be arcuate, conic, flat, aspheric, higher order aspheric, or of any other configuration, as desired. Tolerances of less than one millionth of an inch are occasionally encountered in such applications. Very high optical quality in the range of from 0.50 to 3.0 wavelength of error can be achieved by mirrors made from the substrates of the present invention. Such accuracy is achievable throughout a wide variety of mirror surface shapes. Very stiff thermally stable structures are required to hold such close tolerances, particularly where thermal cycling and/or thermal gradients of as much as several hundred degrees Centigrade occur.

The structures should be as thermally inert as possible. Some thermal expansion and contraction is inevitable. Thus the nature of the substrates must be such that this expansion and contraction is uniform, predictable and repeatable. This enables the expansion and contraction to be compensated for with great accuracy. The effects of thermal shock and thermal gradients across the structure should be minimized. Physical strength to withstand mechanical shock, vibration and acceleration loads is required. Mass is also of great concern, particularly in space-based applications, rapid response applications where inertia must be overcome in the rapid acceleration and movement of a mirror, and in hand held applications. The reticulated structural foam provides the required stiffness, strength and thermal stability with very low mass. Areal densities, that is, the mass per unit area of the mirror surface, are very low. Typical mirror substrates according to the present invention have densities ranging from approximately 5 to 20 kilograms per square meter.

BRIEF DESCRIPTION OF THE DRAWINGS

The present invention provides its benefits across a broad spectrum of light weight rigid structures, and particularly lightweight, rigid, precision, mirror substrates. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation:

FIG. 1 is a cross-sectional view of a preferred embodiment of the invention;

FIG. 2 is a fragmentary cross-sectional view of further higher density embodiment;

FIG. 4 is a cross-sectional view of a silicon carbide reinforced vitreous carbon ligament according to the present invention;

FIG. 5 is a cross-sectional view similar to FIG. 4 including a second silicon carbide layer.

DETAILED DESCRIPTION OF THE PREFERRED EMBODIMENTS

Figure 3:
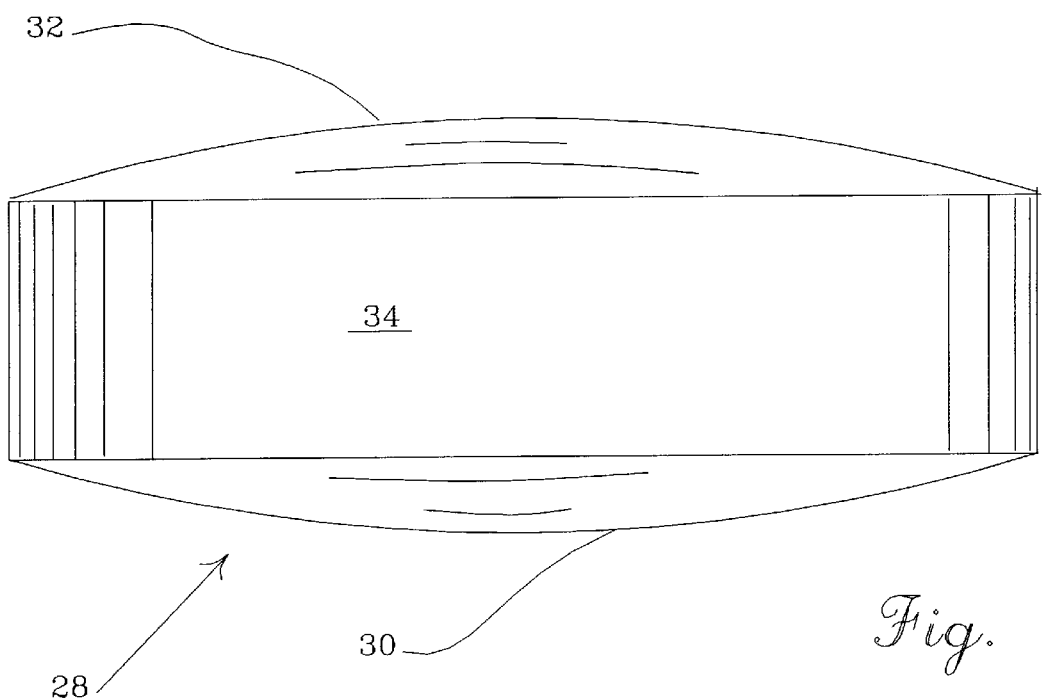
FIG. 3 is an elevational view of a further biconvex embodiment of the invention.

Referring now to the drawings wherein like reference numerals designate identical or corresponding parts throughout the several views.

Referring particularly to the drawings, there is illustrated generally at 10 a rigid, lightweight, thermally stable, single sided, concave, mirror substrate. Mirror substrate 10 is composed of a reticulated base or core 12, a fully dense interlayer 16 bonded to the arcuate surface of core 12 through a bonding layer 14. A near net shape, formed in situ, deposit of a reflective substance is plated onto the opposed surface of interlayer 14 to form coating 18. In order to achieve thermal stability, the respective coefficients of thermal expansion of the reticulated base 12, the interlayer 16, the bonding layer 14 and the coating 18 are very similar, that is, they are within plus or minus 10 and preferably 5 percent. Although not shown, it will be understood that the entire structure is encapsulated in a coating of, for example, silicon carbide which was formed at least in part when the coating 18 was formed. The coefficients of thermal expansion that must be matched are thus those of the coating, preferably silicon carbide, and the interlayer, which is preferably graphite.

Base or core 12 is preferably composed of, for example, reticulated, vitreous, carbon foam reinforced by one or more preferably chemical vapor deposition applied coatings of a structural material such as, for example, CVD SiC, CVD PG, CVD SI, or Be. The bonding layer 14 is composed of a material that has at least a thermal coefficient of expansion that is about the same as that of the structural coating and the interlayer 16. Coating 18 is preferably an optical grade, formed in situ, near net shape layer of the same material which forms the structural coating, for example, silicon carbide. Preferably, the coating 18 is formed by utilizing chemical vapor deposition techniques.

In a preferred embodiment a reticulated polyurethane foam was selected and impregnated throughout with a carbon bearing resin. The fully impregnated polyurethane foam was subjected to a series of pyrolysis steps to yield a porous, reticulated, vitreous carbon body, all according to known conventional procedures. The fragile reticulated vitreous carbon body had a void volume of about 97 percent, and about 80 pores per inch. A thin coating of silicon carbide was applied to the foam to strengthen it. This coating was applied using chemical vapor deposition techniques. A void volume of from about 95 to 97 for this unreinforced carbon foam is preferred. Preferred pores per inch values for this material are from about 45 to 100. The average maximum spacing between ligaments in this reticulated carbon foam was about 0.010 inches. An average maximum spacing of from about 0.005 to 0.020 is preferred.

A near net shape concave foam support having a diameter of about 10 inches and a radius of curvature of about 72 inches was then machined from a 20 inch by 20 inch by 8 inch reticulated, vitreous, carbon foam billet. The billet was then rough machined to a round configuration having a diameter of about 10 inches and a thickness of about 0.5 inches.

The rough machined foam billet was then rigidified by uniformly coating the ligaments throughout with a layer of silicon carbide. Uniform coating was accomplished utilizing a chemical vapor infiltration technique wherein the foam blank was heated to about 1200 degrees Centigrade and a reactive stream of methyltrichlorosilane in the presence of hydrogen was flowed through the blank. Thermal decomposition and reaction occurs on or near the heated surfaces throughout the carbon foam billet, causing a deposit of silicon carbide to form on the ligaments. The deposit on the ligaments was allowed to form a coating that is about 2.5 mils thick and fully encasing the other elements of the structure. The deposit on the faceplate is preferably from about 1 to 3 millimeters thick, and from about 3 to 4 mils on the filaments. This coating would be thicker for larger mirrors, for example, a mirror blank 1 meter in diameter would generally require a coating of about 3 millimeters in thickness.

Upon examination, the silicon carbide deposit on the ligaments was found to be composed of fine equiaxed, not columnar, grains. A grain size of about 2–4 microns was observed. Grain sizes of from about 2 to 4 microns are generally preferred. The bulk density of the resulting silicon carbide reinforced vitreous carbon foam was about 0.25 grams per cubic centimeter. Bulk densities of from about 0.1 to 1.3 grams per cubic centimeter for this machined reinforced foam are preferred. The foam core was about 10 percent dense. The silicon carbide had a coefficient of thermal expansion of about $2.4\ 1/K\times 10^{-6}$. The structure has the coefficient of thermal expansion of the silicon carbide coating, not that of the encapsulated vitreous carbon skeleton.

Next a fully dense graphite interlayer having a thickness of about 2.0 millimeters, and a coefficient of thermal expansion of approximately 2.4 parts per million per degree Kelvin was machined to match the curvature of the machined face of the reinforced foam billet. The interlayer was machined to a lense shape having about a constant thickness throughout. The lens shaped graphite interlayer was bonded to the machined surface of the reinforced foam billet with a commercially available graphite adhesive and the adhesive was pyrolyzed to carbon. The opposed surface of the interlayer was ground to reduce the thickness of the interlayer to about 1 millimeter. Preferably, the interlayer ranges from about 0.5 to 1.5 millimeters in thickness.

The above described silicon carbide chemical vapor deposition process was repeated to form a fully dense, substantially uniform silicon carbide deposit on the opposed surface of the graphite interlayer. The deposit was about 0.030 inches thick. In general, the thickness of the mirror layer ranges from about 0.020 inches, for about 1 to 10 inch diameter mirrors, to about to 0.050 inches for about 11 to 18 inch diameter mirrors. The heating of the base foam material and the flow of the reactant gas are preferably limited as much as possible to the region of the interlayer so that the deposition of silicon carbide is limited as much as possible to the opposed and bonded surfaces of the interlayer. A thin deposit (generally less than about 0.005 inches in thickness) generally forms on the pyrolyzed graphite adhesive layer and on the edges of the graphite layer. The resulting structure is a fully encapsulated monolithic mirror substrate.

It is anticipated that final grinding and polishing of the silicon carbide mirror surface will remove from approximately 0.005 to 0.010 inches of the silicon carbide surface. In general, the remaining mirror surface should have a thickness of at least about 0.020 inches at the conclusion of the grinding. Any thinner, for mirror diameters over approximately 6 inches, and the surface is generally at risk of failure during grinding.

The completed mirror substrate has a diameter of about 10 inches, and a density of about 1.0 gram per cubic centimeter. The concave mirror substrate at the thinnest point was about 0.350 inches thick. In the finished mirror substrate, the average maximum distance between the ligaments is about 0.010 inches. The structural foam core in the finished substrate is about 12 percent dense.

Repeating this example at pore sizes of 10 pores per inch and 100 pores per inch for the structural foam core produces satisfactory results. Using a porous foam interlayer having about 500 pores per inch produces a satisfactory mirror surface. For mirror diameters in excess of approximately 15 inches, the intermediate structure generally is at least about 12 percent dense, and the final substrate is at least about 15, and up to as much as 25 percent dense. Also, where maximum stiffness is required the structural foam core should be at least about 15 percent dense.

FIG. 2 illustrates a reticulated base 26 which is denser (less void volume and more pores per inch) than base 12 in FIG. 1, and an interlayer 22 which has very fine reticulated pores. The reticulated porous interlayer 22 has approximately 500 open cells per inch, and the reticulated base 26 has approximately 80 pores per inch. Interlayer 22 is composed of a vitreous carbon skeleton, reinforced by silicon carbide and machined to a near net shape in the same manner as described hereinabove with reference to base 12 and interlayer 16. Boundary layer 20 between porous interlayer 22 and base 26 is preferably formed of an adhesive which in the fully set and encapsulated form has approximately the same coefficient of thermal expansion as the base 26 and the interlayer 22. Although the use of a bonding layer is preferred for purposes of manufacturing, it is possible to make the substrate without an adhesive bonding layer, because the completed substrate is held together by the final coating with very little, if any, of the bonding strength being contributed by the adhesive bonding layer. The pores in interlayer 22 are very fine so that they inhibit high infiltration and promote the formation of a fully dense coating 24 that has a near net shape to the intended mirror. The lower void volume of base 26, as compared to base 12, provides a stiffer but denser structure. Also, it is more difficult to achieve coating throughout the more closely spaced ligaments in the base 26. The use of a porous interlayer 22, as compared to the fully dense interlayer 16, helps to decrease somewhat the overall density of the structure, and may in certain instances increase its stiffness. In, for example, space applications, the reduction of density in stiff thermally stable structures is very important. The denser foam core 26 has, for the purposes of illustration only, been shown with the porous interlayer 22. It should be understood that the porous interlayer 22 does not necessarily require any more support than the fully dense layer 16.

FIGS. 4 and 5 illustrate two reinforcing coating steps that occur during a preferred practice of the present invention. The ligaments in the body of foam are represented generally at 36 at the stage just before the fully dense graphite layer 16 is bonded to the base 12. Preferably, the vitreous carbon ligament 38, in the body of structural foam, is fully coated by chemical vapor infiltration with a reinforcing and stiffening layer of silicon carbide 40 to form the partially reinforced ligament 36. A fully reinforced ligament in a fully manufactured mirror substrate is illustrated generally at 42. A second layer of silicon carbide, plated out at the time the mirror layer 18 is formed, is illustrated at 44.

An alternative form of mirror substrate according to the present invention is illustrated in FIG. 3. A symmetrical, biconvex or dual facesheet mirror substrate is shown generally at 28. Substrate 28 includes an optional mounting ring 34, a first convex mirror substrate surface 30, and a second convex mirror substrate surface 32. Mounting ring 34 serves to provide a convenient means for mounting the mirror substrate. These substrate mirror surfaces, as well as those illustrated in FIG. 6, are illustrated as being symmetrical, however, it will be understood that they may be of different curvature, if desired.

Figure 6:
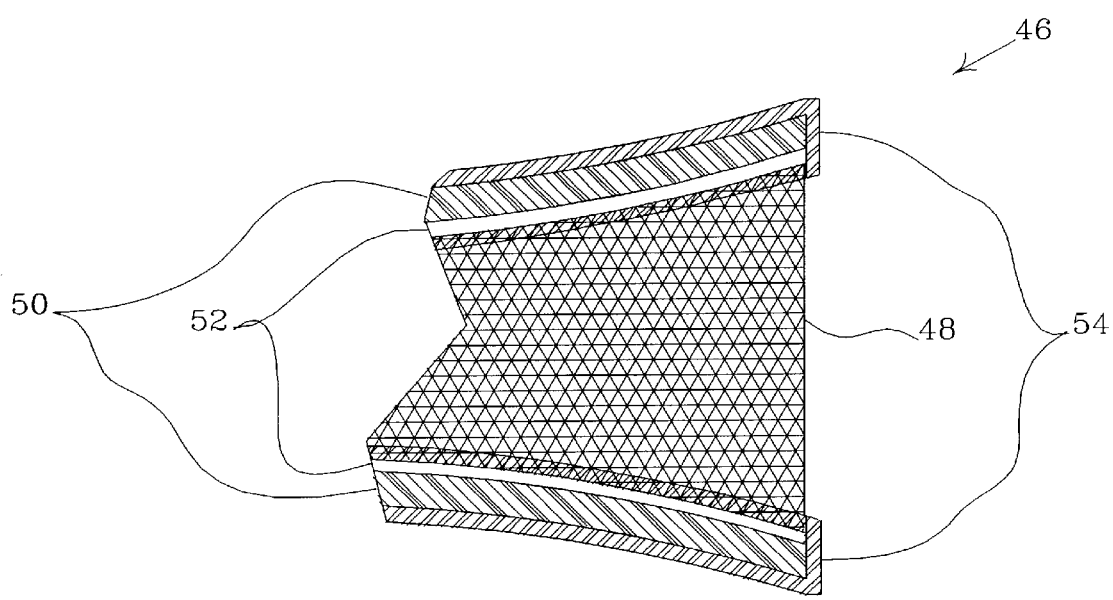
FIG. 6 is a fragmentary cross-sectional view of a further biconcave embodiment of the invention.

A fragmentary cross-sectional view of a biconcave mirror surface is illustrated generally at 46 in FIG. 6. A high void volume substrate or base 48 serves to support two fully dense interlayers 50 through a pair of bonding layers 52. The optical grade deposits of silicon carbide 54 are illustrated as fully encapsulating the interlayer and bonding layers. As will be understood, this layer also fully encapsulates the ligaments of the base 48. This serves to lock the interlayer to the base 48. The open nature of the reticulated foam support permits the silicon carbide to infiltrate the foam and deposit on the bonding layer at the interface with the foam. The silicon carbide also deposits out on the ligaments of the foam body so that all of the exposed surfaces of the structure are coated with silicon carbide during the formation of deposits 54. The structure is thus one silicon carbide encapsulated monolith. This permits the structure to retain optical accuracy when used in extremely harsh environments.

The elements of the composite structure are preferably selected so that the coefficients of thermal expansion of the various elements are very similar, even though the elements of the structure are all encapsulated in and held together by a formed in situ monolithic coating of material which dominates the physical properties of the structure. Also, the coefficients of thermal expansion are selected so as to be as low as possible, thus rendering the structure as thermally inert as possible. In this way, mirror surface distortion caused by thermal cycling over wide temperature ranges and gradients of as much as several hundred degrees Centigrade are avoided. Such conditions occur in both the use and manufacturing of such structures.

Preferably, the materials of construction are selected so that there is no permanent distortion of the structure with repeated or uneven temperature cycling (thermal hysteresis). In general, highly thermally conductive materials such as chemical vapor deposition applied silicon carbide coatings do not exhibit thermal hysteresis or anisotropic expansion when subjected to temperature gradients of as much as one hundred degrees Centigrade or more across their structure. The preferred materials for use according to the present invention include, for example, chemical vapor deposited silicon carbide (CVD SiC), chemical vapor deposited pyrolitic graphite (CVD PG), chemical vapor deposited silicon (CVD Si), and beryllium.

The optical grade deposit (preferably silicon carbide) is preferably laid down on the exposed surface of the interlayer by a chemical vapor deposition plating operation. Purity and uniformity in a monolithic, fully dense, isotropic, coating are thus achieved. The supporting prefabricated interlayer is preferably shaped so that the highly polishable deposit on the interlayer is near net shape as deposited. This reduces the amount of grinding that is required to shape the mirror surface, and also reduces the weight of the mirror deposit layer. The uniformity of the formed in situ deposit, and the use of a prefabricated interlayer permits close control of the mass of the mirror substrate. The mass is very uniformly distributed, which helps prevent distortion of the mirror surface under various thermal conditions. Also, the overall mass is minimized. To these ends, the prefabricated interlayer is also preferably of a substantially uniform thickness.

The openings in the reticulated foam base are too large to permit the chemical vapor deposition formation of the mirror surface deposit directly on the base without increasing the density of the base to an unacceptable degree. A dense interlayer is thus required between the foam base and the near net mirror surface to serve as a support for the mirror layer deposit. Without the interlayer, the increase in the density of the structure occurs for two reasons. Particularly with silicon carbide, the mirror surface deposit plates out throughout the reticulated foam as well as at the exposed surface of the interlayer. A substantial thickness of the deposited material would be required to provide a deposit which completely fills the surface of the reticulated foam so that it could be ground and polished to a blemish free high optical quality surface. The porous core would thus become substantially a solid brick of silicon carbide. This would be too heavy for lightweight applications. Also, the mirror surface would require a substantial amount of grinding to achieve a precision optical surface.

The ligaments in the reticulated base are closely and substantially uniformly spaced so that the interlayer and the mirror surface thereon (the faceplate) are substantially uniformly supported. Distortions of the mirror surface due to non-uniform or discontinuous support are thus avoided. The number of contact support points between the reticulated base and the interlayer per unit area is very high, being in the order of from approximately 1,000 to 20,000, and preferably approximately 5,000 to 12,000 per square inch. Throughout a single core member the pore sizes preferably should not vary by more than approximately 10 percent. The response across the foam core to thermal gradients and changes is thus as uniform as possible. To provide such uniformity throughout the core, the pore sizes of the open cells within the skeleton upon which the structural monolithic coating is formed are as uniform as possible.

The rigid foam core is prepared, for example, by first forming a reticulated vitreous carbon foam body using conventional procedures. The foam body is reinforced by coating the vitreous carbon ligaments throughout with, for example, silicon carbide. This coating forms stiff ligaments that have the characteristics of the coating rather than of the skeletal material. Vitreous carbon skeletons, for example, are generally fragile. The strength of the foam core is provided by the coating. Once a coating of, for example, silicon carbide is formed throughout the foam, the body takes on the thermal, mechanical and chemical characteristics of the silicon carbide. The vitreous carbon skeleton is generally partially destroyed in the formation of the silicon carbide coating. The amount of coating that is deposited on the ligaments of the reticulated foam is generally dictated by the desired degree of stiffness. Stiffness generally increases as the thickness of the structural coating increases. The relationship is not, however, necessarily linear. The density, however, also increases as the thickness of the structural coating increases. In general, the minimum acceptable thickness of structural coating deposit is preferably used so as to minimize the density. In general, for reticulated foam with a substantially constant number of pores per inch, as the size of the mirror substrate increases, the thickness of the structural coating deposit must be increased.

The structural coating material, for example, silicon carbide, is conveniently applied throughout the skeleton, for example, a vitreous carbon foam skeleton, in a chemical vapor infiltration operation. The reticulated nature of the foam skeleton permits the formation of a uniform structural coating on the ligaments throughout the body of foam.

Preferably, although it is not essential, an initial structural coating is applied to the fragile vitreous carbon foam skeleton before the interlayer is bonded to it. This provides a stiff stable base for the interlayer. Also, before the foam base is machined to the desired near net shape, it is generally necessary to apply a thin coating of silicon carbide so that the foam is strong enough to withstand the stress of the machining operations and the necessary handling. Generally, a second strengthening layer of silicon carbide is inevitably applied to the ligaments in the body of foam as the mirror layer is formed on the exposed surface of the intermediate layer. This second strengthening layer serves to fully encapsulate and bond all of the components together into one monolithic coated structure which has a continuous outer surface. If desired, all or most of the strengthening layer can be applied to the ligaments in the body of the foam as the mirror layer is being formed. Generally, however, it is preferable to stiffen the body of foam somewhat before the interlayer is applied.

The monolithic deposit may not be complete over the entire structure because, for example, the requirements of manufacturing dictate that the substrate and its elements be supported while the deposit is applied. For example, those areas where the support contacts the substrate will inevitably receive little or no coating. Thus, a ligament at the very outermost surface of the foam core may not be encapsulated on the side where it rests on a support surface during the coating operation. The terms "monolithic", "fully encapsulated", and the like are intended to include such structures where the practicalities of the situation preclude encapsulating some small region of the substrate, and the physical properties of the substrate are not thereby significantly altered.

The interlayer is preferably formed separately and bonded to the reinforced, reticulated base or substrate. This provides a solid surface to receive the mirror coating without requiring that the substrate be solid throughout. The interlayer is preferably only thick enough to support the mirror coating. The interlayer also serves to provide a support for the mirror surface that is not as brittle as the mirror surface itself. This is an advantage, particularly during manufacturing.

Bonding of the interlayer to the base is generally accomplished by the use of a small, uniformly applied amount of an adhesive which, when cured, has about the same coefficient of thermal expansion (approximately plus or minus ten and preferably five percent) as the base and interlayer. Where the foam is silicon carbide reinforced vitreous carbon, and the interlayer is fully dense graphite, a commercially available graphite adhesive is preferably used. This adhesive is generally composed of carbon or graphite powder mixed with a carbonizing resin. The carbonizing resin converts entirely to carbon when it is pyrolyzed, so the resulting bond is all carbon. The composite structure, with the green adhesive layer, is fired in an inert or reducing atmosphere to form the adhesive layer into a rigid carbon bond between the reticulated foam body and the interlayer. This rigid carbon bond serves to hold the elements in the desired assembled configuration until the monolithic structural coating is formed. The amount of adhesive is minimized and it is applied uniformly so as to produce as uniform a product as possible. The amount of adhesive is preferably minimized by limiting it to that which is required to produce a bond that will hold the components together until an overall monolithic structural coating is applied. One suitable commercially available adhesive is provided by Cotronics under the designation Graphite Adhesive 931.

The interlayer is preferably configured so that it has a substantially uniform thickness throughout in the fully manufactured mirror substrate. This tends to eliminate any distortions that might occur by reason of regions of different thickness responding differently to temperature gradients and changes. There are several different ways of arriving at the final uniform thickness. For example, the area of the foam where the interlayer is to be mounted is preferably shaped to approximately the shape of the final mirror surface. A mating surface of the interlayer is shaped so as to conform to the area of foam where it is to be mounted. The exposed surface which will support the mirror coating can be shaped before mounting to approximately the final required shape or not, as desired. After the interlayer is mounted to the foam, the interlayer can be further shaped to bring it to the desired shape and thickness. The reticulated structural foam blank and the interlayer are preferably machined to approximately the desired mirror substrate shape before the near-net-shaped interlayer is bonded to the foam blank.

A preferred interlayer is initially a separate layer composed of fully dense graphite which has at least thermal response characteristics which are the same as or very similar to those of the optical deposit. As will be understood by those skilled in the art, graphite is generally not available in a fully dense form. There is almost always some porosity in graphite. It is, however, not porous to the extent that fluids will flow through it. The surface of such graphite appears to be smooth and unbroken when examined closely by the unaided human eye. The expression "fully dense graphite" is intended to include those commercially available graphites that have less than theoretical full densities. A suitable commercially available graphite, for example, is provided by Toyo Tanso under the designation Grade SiC-6. This Grade SiC-6 graphite has a thermal expansion coefficient that is almost identical to that of chemical vapor deposited silicon carbide.

The interlayer is conveniently bonded to the foam substrate using any one of several generally known and available graphite adhesives, followed by pyrolysis to convert the adhesive to carbon. After bonding, and before the optical grade silicon carbide coating is applied, the exposed surface of the graphite interlayer can be ground to about the desired shape of the final mirror surface. Also, the thickness of the interlayer can be reduced by such a grinding step. This minimizes the areal density of the resulting substrate.

The final plating operation (preferably chemical vapor deposition) is preferably carried to the point where the entire structure, including the bond between the interlayer and the structural reticulated foam, is fully encapsulated by the resulting deposit, for example, silicon carbide. Because of the porous nature of the reticulated foam core, particularly where the coating is applied using chemical vapor deposition techniques, the carbonized adhesive layer which is exposed on the reticulated foam core side of the interlayer is also coated. Preferably, the interlayer and interlayer bonding layer are both fully encapsulated by the final deposit so that at least the thermal response of the final structure closely resembles that of the coating material, preferably, silicon carbide.

Where the skeleton for the reticulated foam is defined by vitreous carbon foam, that vitreous carbon foam is preferably formed using conventional procedures. Such procedures include the infiltration of a reticulated polyurethane foam with an organic resin followed by carbonizing in an inert or reducing atmosphere to produce a reticulated vitreous carbon foam which can then be shaped as desired.

The properties of the mirror substrates according to the present invention are tailored so that they are suitable for use as very precise mirrors. The physical properties which are generally of most significance in high precision mirror applications include density, thermal expansion coefficient, thermal conductivity, elastic modulus, specific stiffness, inertia loading parameter, thermal distortion parameter, and thermal stress parameter. Preferably, the density, thermal expansion coefficient, and inertia loading parameter, should be as low as possible, and the thermal conductivity, elastic modulus, specific stiffness, thermal distortion parameter, and thermal stress parameter should be as high as possible. The values of these physical properties for the preferred materials, namely, chemical vapor deposited silicon carbide (CVD SiC), chemical vapor deposited pyrolitic graphite (CVD PG), chemical vapor deposited silicon (CVD Si) and beryllium are set forth in Table I. For comparison purposes, the values for molybdenum, and silica are also included in Table I. The recited range of property values for CVD PG reflects the influence of variable processing. The physical properties of CVD PG depend upon how it is made.

The values given in Table I are for fully dense materials. The values given in Table I for the properties of these materials are representative of the solid mirror face plate material. Reticulated foams made from these materials exhibit values which, in some instances, are very similar to the fully dense materials, and in others differ substantially from the fully dense form. For example, the thermal expansion coefficient of silicon carbide foam is virtually identical to that of fully dense silicon carbide, while the thermal conductivity for ten percent dense (only 10 percent of the volume of the foam is solid) silicon carbide reticulated foam ranges from about 1 to 3 as compared to about 120 W/m·K for the fully dense form.

As indicated in Table I, the density is conveniently expressed in kilograms per cubic meter ($kg/m^3$), and preferably ranges from about 3.5 to 1.5 or lower $kg/m^3$ for the preferred faceplate materials. When formed into reticulated foam the density is less depending upon the characteristics of the foam. A foam which is, for example, ten percent dense (90 percent void volume), will have a density which is about ten percent that of the solid material. The thermal expansion coefficient is expressed as 1/degrees Kelvin times ten to the minus sixth ($1/K \times 10^{-8}$), or one part per million per degree Kelvin (1 ppm/K), and preferably ranges from about 3.5 to 0.5 or less $1/K \times 10^{-8}$ for the preferred materials at room temperature. The inertia loading parameter is a physical property that is defined as the ratio of density to elastic modulus, and is considered to be a very significant parameter. The inertia loading parameter is conveniently expressed as kilograms per Newton-meter times ten to the minus eighth ($kg/N \cdot m \times 10^{-8}$). The inertia loading parameter preferably ranges from about 2 to 0.5 or less $kg/N \cdot m \times 10^{-8}$ for the preferred materials. Thermal conductivity is expressed as watts per meter-degree Kelvin (W/m·K), and preferably ranges from about 100 to 400 or more W/m·K for the preferred materials. Elastic modulus is expressed in gigapascals (GPa), and preferably ranges from 150 to 500 or more GPa for the preferred materials. Specific stiffness is expressed in Newton-meters per kilogram times ten to the sixth ($N \cdot m/kg \times 10^6$), and preferably ranges from about 60 to 170 or more $N \cdot m/kg \times 10^6$ for the preferred materials. The thermal distortion parameter is expressed in Watts per meter times ten to the seventh ($W/m \times 10^7$), and preferably ranges from about 1 to 50 or more $W/m \times 10^7$ for the preferred materials. The thermal stress parameter is expressed in square meters per second times ten to the minus one ($m^2/s \times 10^{-1}$), and preferably ranges from about 0.5 to 15 or more $m^2/s \times 10^{-1}$ for the preferred materials.

TABLE I

| Property | CVD SiC | CVD PG | CVD Si | Be | ULE* silica | Mo |
|---|---|---|---|---|---|---|
| Density $kg/m^3$ | 3.21 | 2.0 | 2.33 | 1.85 | 2.2 | 10.2 |
| Thermal expansion coefficient $1/K \times 10^{-8}$ | 2.4 | 1.0 | 3.1 | 12 | 0.03 | 5.4 |
| Inertia loading parameter $kg/N \cdot m \times 10^{-8}$ | 0.69 | 0.71 | 1.4 | 0.65 | 3.28 | 3.14 |
| Thermal conductivity W/m·K | 120 | 140–372 | 130 | 184 | 1.3 | 134 |
| Elastic modulus GPa | 466 | 281 | 166 | 285 | 67 | 325 |
| Specific stiffness $N \cdot m/kg \times 10^6$ | 145 | 141 | 71.2 | 154 | 30.5 | 31.9 |
| Thermal distortion parameter $W/m \times 10^7$ | 10.4 | 14–37 | 4.6 | 1.82 | 4.33 | 2.5 |
| Thermal stress parameter $m^2/s \times 10^{-1}$ | 2.2 | 5.0–13 | 2.8 | 0.64 | 6.47 | 0.76 |

*Ultra low expansion.

In general, the areal density of the substrates according to the present invention should be minimized consistent with providing the required precision optical mirror surfaces. The areal density of the substrates, including the interlayer, generally ranges from about 2 to 20 and preferably from about 3 to 15 kilograms per square meter ($kg/m^2$) of mirror surface. The areal density of the preferred chemical vapor deposited silicon carbide foam core, without the interlayer, generally ranges from about 1 to 15, and preferably from about 2 to 10 kilograms per square meter of intended mirror surface. The elastic modulus in compression of the preferred foam core generally ranges from about 35 to 200 GPa, and preferably from about 70 to 140 GPa. The elastic modulus in tension is approximately one-third lower.

The foam core or base is preferably produced under conditions such that there are generally from about 10 to 300, and preferably approximately 40 to 200, pores per inch in the reticulated foam. In general the foam base is from approximately 5 to 25, and preferably from about 10 to 15 percent dense. That is, it is preferably from about 85 to 90 percent void volume.

The initially separate interlayer is preferably as dense as possible. Where, however, a foam material is used as the interlayer, it must be capable of permitting the formation of a solid, smooth mirror surface with a deposit which is less than about 5 millimeters thick. To this end, in general, the surface of the foam which is used for the interlayer has pores which range in average diameter from about 0.1 to 3 mils, and preferably less than about 1 mil where silicon carbide is used as the mirror surface. The term "dense" as applied to the interlayer is intended to include surfaces which range from fully solid to those which include pores that have sizes up to about 3 mils, that is from about 0 to 3 mils. Where, for example, graphite is used as the mirror surface, the average pore size can range up to as much as 5 to 10 mils because it deposits more rapidly, and bridges the pores without penetrating the foam as easily as silicon carbide does.

The chemical vapor deposition of silicon carbide is well know and is conveniently accomplished by the thermal decomposition of various precursors. One example of such a thermal decomposition reaction is that of methyltrichlorosilane in accordance with the following equation at a temperature of 1200 degrees Centigrade:

$$CH_3SiCl_3 \rightarrow SiC + 3HCl$$

What have been described are preferred embodiments in which modifications and changes may be made without departing from the spirit and scope of the accompanying claims. Obviously, many modifications and variations of the present invention are possible in light of the above teachings. It is therefore to be understood that, within the scope of the appended claims, the invention may be practiced otherwise than as specifically described.

What is claimed is:

1. A method of making a composite optical mirror substrate including a mirror surface having a shape comprising the steps of:

selecting a reticulated foam skeleton which is less than approximately 10 percent dense and comprises ligaments, and forming said reticulated foam skeleton into a core for said mirror, a first face of said reticulated foam skeleton being formed into approximately the shape of said mirror surface;

selecting a prefabricated dense material having a first surface and a second surface generally opposed to said first surface, said dense material having a first thermal expansion coefficient, and forming said first surface to approximately the shape of said mirror surface, and said second surface to approximately conform to the shape of said first face;

rigidly mounting said second surface to said first face through a bonding material to form a workpiece;

selecting a structural and optical coating material having a second thermal expansion coefficient, said first and second thermal expansion coefficients being within about 10 percent of each; and fully encapsulating said workpiece in a formed in situ layer of said coating material, said layer comprising an optical grade deposit on said mirror surface and encapsulating said bonding material and said ligaments throughout said reticulated foam skeleton, said mirror surface being on said first surface, whereby the thermal expansion coefficient, thermal conductivity, elastic modulus, specific stiffness, inertia loading parameter, thermal distortion parameter, and thermal stress parameter properties of said composite optical mirror substrate are substantially those of said coating material.

2. A method of making a composite optical mirror substrate including a core having a shape and a mirror surface having a shape comprising the steps of:

preparing a reticulated vitreous carbon skeleton having a void volume of less than about 97 percent, and having about the shape of said core;

selecting a prefabricated graphite interlayer, a face of said graphite interlayer having about the shape of said mirror surface;

mounting said graphite interlayer to said core; and encapsulating said skeleton and said graphite interlayer with a chemical vapor deposited coating of silicon carbide, whereby said composite optical mirror substrate has approximately the thermal expansion coefficient, thermal conductivity, elastic modulus, specific stiffness, inertia loading parameter, thermal distortion parameter, and thermal stress parameter properties of said coating, and said mirror surface being on said face of said graphite interlayer opposed to said skeleton.

3. A method of making a composite optical mirror substrate of claim 2 wherein said graphite interlayer is fully dense.

4. A method of making a composite optical mirror substrate of claim 2 wherein said graphite interlayer is shaped to substantially a constant thickness.

5. A method of making a composite optical mirror substrate of claim 2 including the steps of applying an initial coating of chemical vapor deposited silicon carbide to said skeleton before mounting said graphite interlayer to said core.

6. A composite optical mirror substrate including a mirror surface comprising:

a reticulated foam core comprising ligaments and being less than about 25 percent dense;

a prefabricated dense interlayer, said interlayer having a surface and being rigidly mounted to said reticulated foam core; and a continuous formed in situ deposit encapsulating said ligaments and interlayer, and having thermal coefficient of expansion characteristics, said composite optical mirror substrate having approximately the thermal coefficient of expansion characteristics of said deposit, said mirror surface being on said interlayer opposed to said reticulated foam core.

7. A composite optical mirror substrate of claim 6 wherein said interlayer has a substantially constant thickness throughout.

8. A composite optical mirror substrate of claim 6 wherein the surface of said interlayer includes pores ranging in size from about 0 to 3 mils.

9. A composite optical mirror substrate of claim 6 wherein said reticulated foam core is less than about 15 percent dense.

10. A composite optical mirror substrate including a mirror surface comprising:

a reticulated foam core comprising chemical vapor deposited silicon carbide ligaments and being less than about 25 percent dense, said ligaments having a configuration;

a prefabricated interlayer comprising fully dense graphite and having a substantially uniform thickness, said graphite interlayer being fully encapsulated in a coating of chemical vapor deposited silicon carbide and one side of said interlayer being rigidly mounted to said reticulated foam core through said coating, and a generally opposed side of said interlayer being exposed, said coating on said opposed side forming a near net shape mirror surface, said composite optical mirror substrate having approximately the thermal expansion coefficient, thermal conductivity, elastic modulus, specific stiffness, inertia loading parameter, thermal distortion parameter, and thermal stress parameter properties of said coating.

11. A composite optical mirror substrate of claim 10 wherein said graphite has substantially the same thermal expansion coefficient as said coating.

12. A composite optical mirror substrate of claim 10 wherein said reticulated foam core is less than about 15 percent dense.

13. A composite optical mirror substrate of claim 10 wherein the configuration of said ligaments is defined by a fully encapsulated vitreous carbon skeleton.

* * * * *